Feb. 8, 1955 T. J. SULLIVAN 2,701,580
HIGH AND LOW PRESSURE SAFETY CUTOFF VALVE
Filed Sept. 21, 1953 3 Sheets-Sheet 1
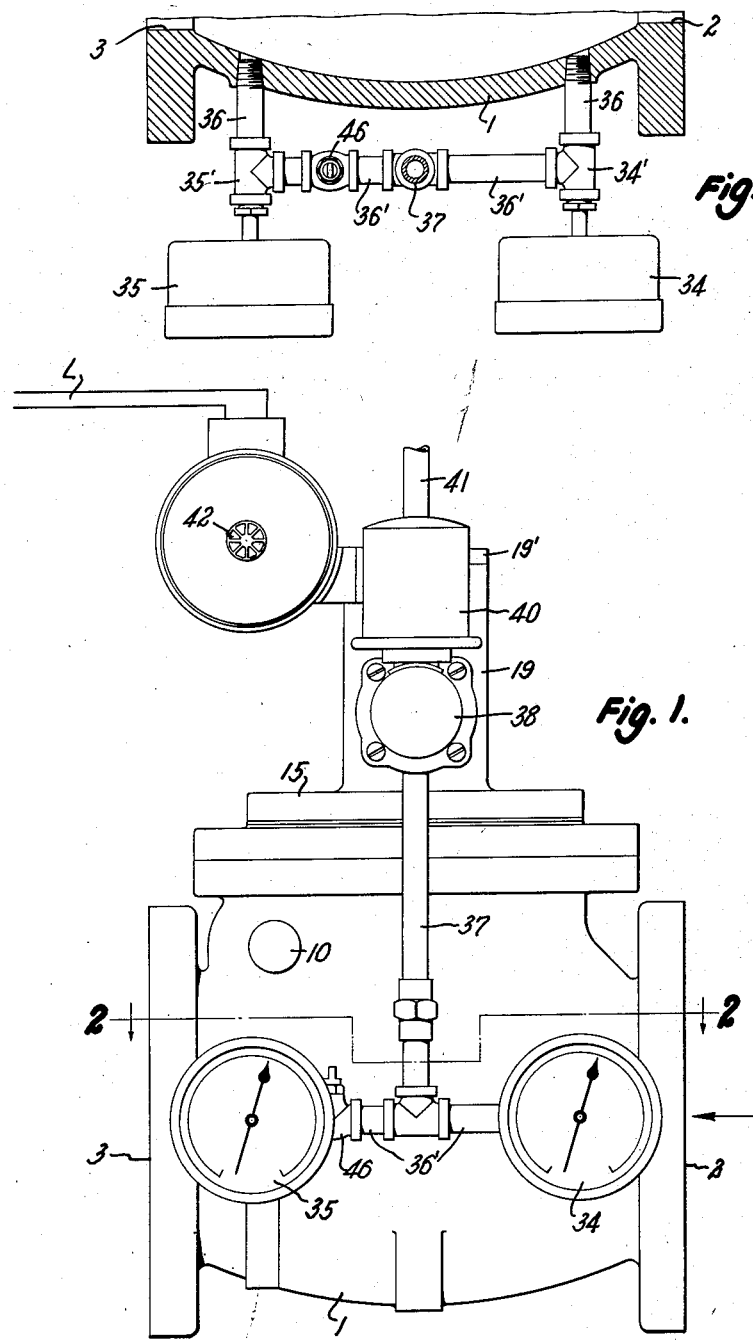
INVENTOR:
Timothy J. Sullivan,
BY Pierce, Scheffler & Parker,
ATTORNEY Feb. 8, 1955     T. J. SULLIVAN     2,701,580
HIGH AND LOW PRESSURE SAFETY CUTOFF VALVE
Filed Sept. 21, 1953     3 Sheets-Sheet 2
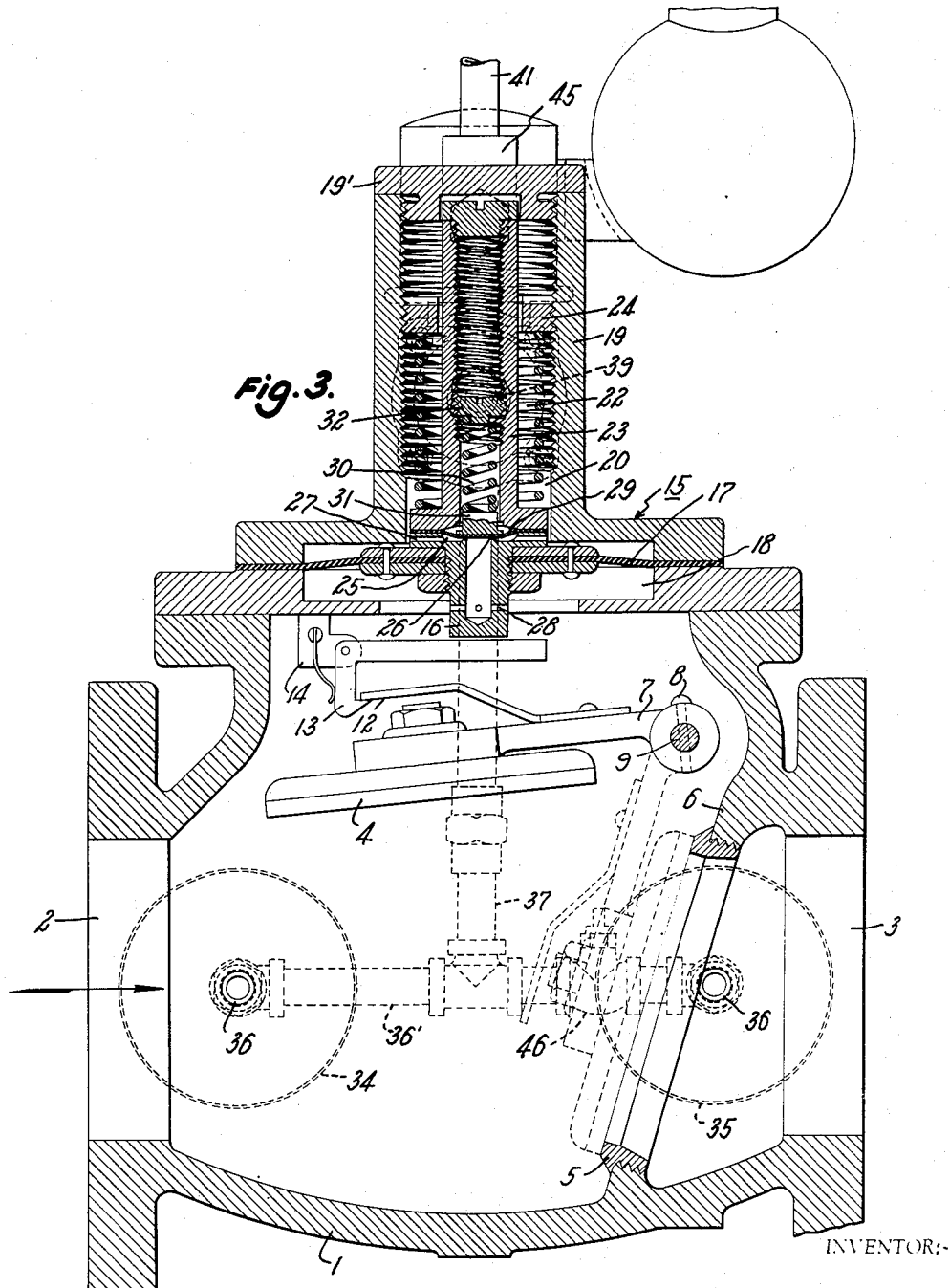
INVENTOR:-
Timothy J. Sullivan,
BY Pierce, Scheffler + Parker,
ATTORNEY

United States Patent Office 2,701,580
Patented Feb. 8, 1955

2,701,580

HIGH AND LOW PRESSURE SAFETY CUTOFF VALVE

Timothy J. Sullivan, Butte, Mont., assignor to Sullivan Valve and Engineering Company, Butte, Mont., a corporation of Montana Application September 21, 1953, Serial No. 381,255

5 Claims. (Cl. 137—458)

This invention relates to a high and low pressure safety cutoff valve for installation in pressure gas lines such as the fuel supply lines to gas-fired heaters and boilers of domestic or commercial types, and more particularly to safety valves which close automatically when the gas pressure rises above or falls below a preselected normal operating range and which, when closed, must be reset manually to restore operation of the burner.

Objects of the invention are to provide, as a self-contained assembly, a valve casing within which a safety cutoff valve is latched in open position, and mechanism for releasing the latch automatically in the event that the gas pressure departs in either sense from a preselected normal operating range, and/or in the event of an electrical failure. More specifically, an object is to provide a safety cutoff valve including a swing check valve that tends to close by gravity and by the pressure of the gas, a trip lever for latching the valve in open position, a main diaphragm for holding the trip lever in operative position so long as the inlet gas pressure is at least equal to the minimum value of the normal operating range, and a small diaphragm-operated pilot valve for passing gas at inlet pressure to the back of the main diaphragm, thereby to release the trip lever, in the event that the inlet gas pressure exceeds the upper limit of the normal operating range of pressures. Another specific object is to provide, in a safety cutoff valve of the type above stated, an electromagnetically operated valve for admitting gas at inlet pressure to the back of the main diaphragm in the event of an electrical failure or when it is desired to close the valve from a remote point. A further object is to provide a safety cutoff including a trip lever and main diaphragm as above stated, and a manually operable valve for venting gas from the rear of the main diaphragm to facilitate the opening of the hinged gate valve after a closure thereof.

These and other objects and the advantages of the invention will be apparent from the following specification when taken with the accompanying drawings, in which:

Fig. 1 is a side elevation of a safety cutoff valve embodying the invention;

Fig. 2 is a fragmentary horizontal section as taken on line 2—2 of Fig. 1;

Fig. 3 is a central vertical section through the valve on a larger scale and as seen from the rear of Fig. 1.

Figure 4:
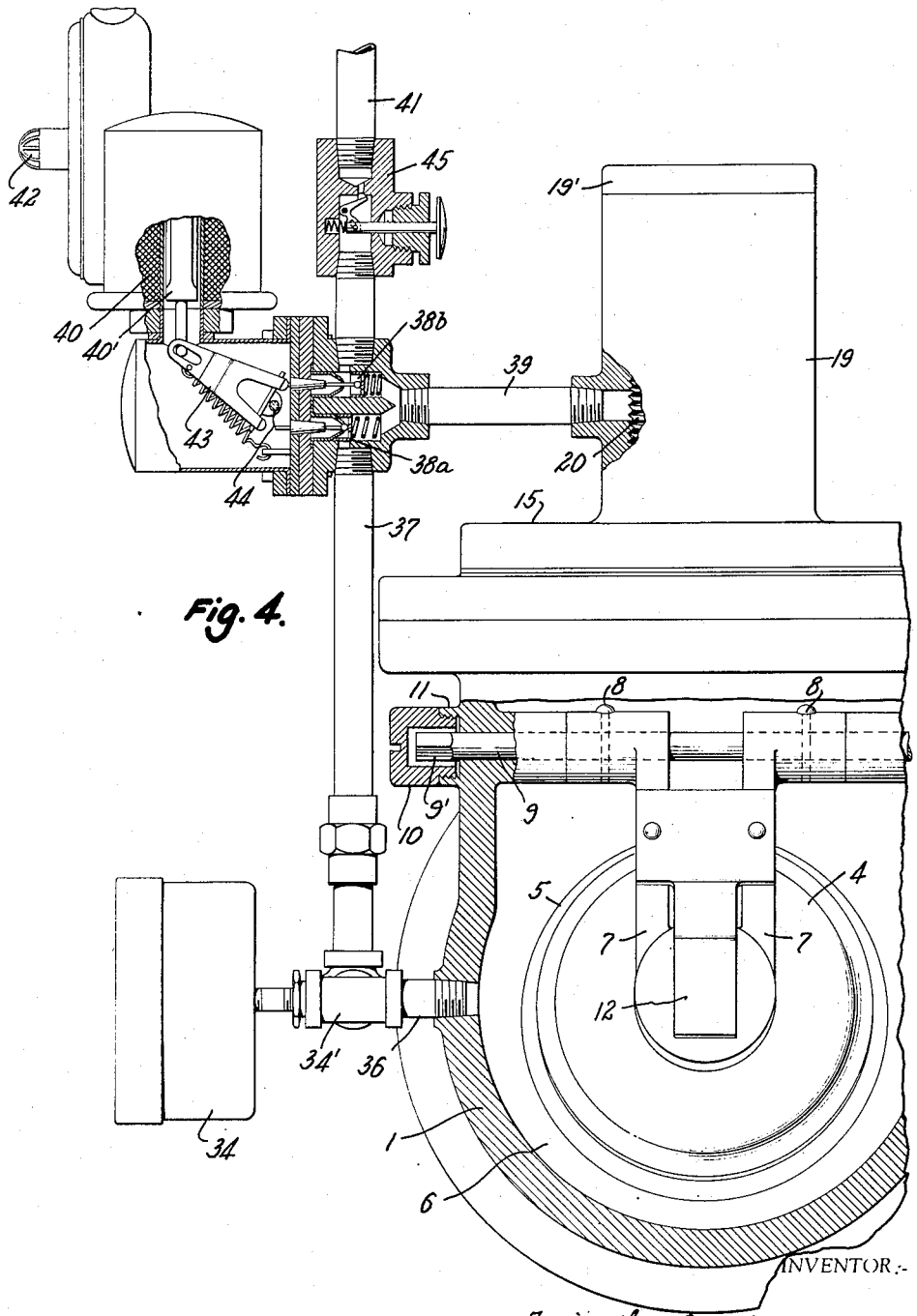
Fig. 4 is an end elevation, with parts in section, showing the cutoff valve closed.

In the drawings, the reference numeral 1 identifies a casing of a safety valve having an inlet opening 2 and an outlet opening 3 for connection into the gas supply line of a furnace in substantially the manner illustrated in Fig. 1 of my prior Patent No. 2,637,331. Flow valve 4 for cooperation with an annular seat 5 on a transverse wall 6 which extends across the casing between the inlet opening 2 and the outlet opening 3 is mounted upon arm members 7 which are secured by pins 8 to a shaft 9 that is journalled in the casing 1 and has a non-circular end 9' extending to the exterior of the casing. A cap 10 is threaded upon a casing boss 11 to extend over the exposed end of shaft 9 to prevent inadvertent adjustments of the valve. The valve has the general form of a swing check valve which tends to close of its own weight and also by the flow of gas through the casing.

A latch strip 12 is secured to the valve arm members 7 and normally engaged by the hooked trip lever 13 to hold the valve 4 in open position.

The trip lever is hinged upon an arm 14 of the cap assembly 15 which closes the upper opening of the valve casing 1, and an arm of the lever extends somewhat below the hollow boss 16 that is carried by a main diaphragm 17. The cap assembly 15 provides a lower diaphragm chamber 18 which opens into the inlet side of the valve casing, and includes an internally threaded sleeve 19 which extends upwardly and is closed by a cap 19' to provide a closed chamber 20 above the diaphragm 17. A coiled spring 22 within the sleeve 19 is seated upon the lower flanged end of a tube 23 that is secured to the diaphragm 17, and the pressure which the spring 22 exerts upon the diaphragm in opposition to the gas pressure in chamber 18 may be regulated by a nut 24 that is threaded into the sleeve 19.

The hollow boss 16 extends through the diaphragm 17 and its upper flanged end is provided with an annular groove 25 which forms an annular seat 26 about the axial bore through the upper portion of the boss 16. Radial passages 27 in the boss flange provide communication between the groove 25 and the interior of the chamber 20, and radial passages 28 in the lower portion of the boss 16 afford communication between the interior of the boss and the inlet chamber of the valve casing, but flow through the boss 16 is normally prevented by a diaphragm 29 which is clamped between the upper end of the boss 16 and the lower flanged end of the tube 23. The diaphragm 29 is normally retained upon its seat 26 by a coiled spring 30 and stud 31 which rests upon the diaphragm, the pressure of the spring 30 being adjustable by a nut 32 which is threaded into the tube 23.

With normal inlet gas pressure, the pressure within the diaphragm chamber 18 overcomes the weight of the diaphragm assembly and the pressure of the spring 22, but the spring 22 forces the diaphragm downwardly to trip the latch lever 13 in the event that the inlet gas pressure drops below a preselected minimum value. If the gas pressure rises above a preselected maximum value, the diaphragm 29 is lifted to admit gas to the chamber 20, thus balancing the pressure on opposite sides of the diaphragm 17 and permitting the spring 22 to trip the lever 13. The tripping pressures are usually set by a factory adjustment of the nuts 23 and 32, but these may be adjusted in the field if desired to meet special conditions.

Pressure gages 34 and 35 are provided for indicating the gas pressure at the inlet side and outlet side for the valve casing, the gages being preferably connected to T's 34' and 35' which are connected into the valve casing by nipples 36, with additional nipples 36' extending between the T's 34', 35' and a pipe 37 which is connected through a valve casing 38 to a pipe 39 which is tapped into the sleeve 19 of the chamber 20 above the main diaphragm 17. The valve casing 38 is provided with a valve 38a which is normally closed to block gas flow from pipe 37 to pipe 39 so long as the solenoid 40 is energized, and a second valve 38b which is normally open to connect pipe 39 to a vent pipe 41 which extends to the exterior of the building in which the furnace is located. The solenoid 40 is energized from the electrical line L which supplies power for the control circuits, not shown, of the furnace, and a signal lamp 42 is preferably connected across the line L adjacent the solenoid to indicate whether or not electrical power is available for operation of the controls.

In the event of a power failure, the armature 40' drops of its own weight, thus rocking lever 43 about its pivot 44 to open the valve 38a and close valve 38b. Gas at inlet pressure is thus admitted to the chamber 20 above the diaphragm 17 and the latter is forced downwardly by the spring 22 to trip the latch lever 13, thereby resulting in a closure of the valve 4. The vent pipe 41 is provided with a spring-pressed valve 45 which is normally closed to prevent a continuous escape of high pressure gas from the chamber 20 in the event that the main valve 4 is closed by an over pressure within the casing 1 or by a failure of the electrical power. A normally closed gas cock 46 is of course provided between the T 35' and the pipe 37 to isolate the closed pressure chamber 20 from the outlet side of the valve casing 1.

In order to open the main valve 4 after it has closed for any reason, the cap 10 must be removed to afford access to the end of the shaft 9, and the shaft must be turned manually to hold the valve open until the gas pressure is built up within the casing 1 to lift the diaphragm 17 and engage the trip lever 13 beneath the latch strip 12. The vent valve 45 may be opened manually to release any pressure gas which may have been trapped in the chamber 20. The gage 34 affords an indication as to whether or not the available gas is under sufficient pressure for normal operation of the equipment and the signal lamp 42 indicates whether or not electrical power is available for the energization of the control circuits.

While the apparatus has been described upon the assumption that the solenoid 40 is energized from a line L which also energizes a control or regulating circuit for the furnace, it is to be understood that the line L may be independent of any control network, and may extend to some remote point from which it may be desired to shut down the furnace.

I claim:

1. A safety cutoff valve for use in a pressure gas line comprising a valve casing divided into an inlet chamber and an outlet chamber by a partition provided within said inlet chamber with a valve seat, a swing check valve in said inlet chamber and cooperating with said valve seat, a hinge rod horizontally journalled in said casing to support said check valve and having an end extending to the exterior of the casing for manual opening of the check valve, a latch strip secured to said check valve, a trip lever hinged on said casing above said valve for engagement with said latch strip to retain said valve in open position, a cap assembly on the top of said valve casing and providing a diaphragm chamber open to the inlet chamber of the valve casing, a main diaphragm in said diaphragm chamber and having a lower surface exposed to said inlet chamber, means to release said latch strip from said trip lever upon downward movement of said main diaphragm, said release means including a boss carried by said main diaphragm and movable thereby into engagement with said trip lever, spring means carried by said cap assembly and opposing upward movement of said main diaphragm by gas pressure in said inlet chamber, means for adjusting the effective force of said spring means, thereby to determine the minimum gas pressure which will prevent release of said latch strip, and auxiliary valve means for balancing the gas pressures on opposite sides of said main diaphragm, thereby to effect downward movement of said main diaphragm by said spring means.

2. A safety cutoff valve as recited in claim 1, wherein said cap assembly includes a closed chamber above said main diaphragm, and said auxiliary valve means establishes communication between said inlet chamber of the valve casing and said closed chamber.

3. A safety cutoff valve as recited in claim 2, wherein said boss has a flanged upper end within said closed chamber, the upper portion of the boss having an axial bore therethrough and the flanged upper end having an annular groove providing an annular seat about said axial bore, radial passages in said flanged end of the boss affording communication between said annular groove and said closed chamber, passages in the lower end of said boss affording communication between said bore and the inlet chamber of the valve casing; and wherein said auxiliary valve means comprises an auxiliary diaphragm engaging said annular seat about said axial bore, and adjustable spring means retaining said auxiliary diaphragm on said annular seat so long as the inlet gas pressure is not greater than a preselected maximum value.

4. A safety cutoff valve as recited in claim 2, wherein said auxiliary valve means comprises an external pipe connection between the inlet chamber of the valve casing and said closed chamber of the cap assembly, and an electromagnetic valve in said external pipe connection.

5. A safety cutoff valve as recited in claim 2, in combination with a pipe connection for venting said closed chamber of the cap assembly to atmosphere, a normally closed vent valve in said pipe connection, and means for manually opening said vent valve.

References Cited in the file of this patent

UNITED STATES PATENTS

| | | |
|---|---|---|
| 2,192,630 | Beam | Mar. 5, 1940 |
| 2,296,648 | McMahon | Sept. 22, 1942 |
| 2,327,055 | McMahon | Aug. 17, 1943 |
| 2,426,364 | Massecar | Aug. 26, 1943 |
| 2,495,628 | Broyles | Jan. 24, 1950 |
| 2,637,331 | Sullivan | May 5, 1953 |